United States Patent
Emadipour et al.

(10) Patent No.: US 7,175,790 B2
(45) Date of Patent: Feb. 13, 2007

(54) COMPOSITION AND METHOD TO FORM ARTICLES SIMULATING STONE

(75) Inventors: John H. Emadipour, Tucson, AZ (US); Gregory S. Novak, Tucson, AZ (US)

(73) Assignee: Arizona Cultured Stone Products, Inc., Tucson, AZ (US)

( * ) Notice: Subject to any disclaimer, the term of this patent is extended or adjusted under 35 U.S.C. 154(b) by 159 days.

(21) Appl. No.: 11/060,662

(22) Filed: Feb. 16, 2005

(65) Prior Publication Data

US 2006/0183837 A1    Aug. 17, 2006

(51) Int. Cl.
*B29C 47/04* (2006.01)
*B29B 9/00* (2006.01)

(52) U.S. Cl. .................. 264/115; 264/122; 264/141

(58) Field of Classification Search ............... None
See application file for complete search history.

(56) References Cited

U.S. PATENT DOCUMENTS

| 5,269,991 | A | * | 12/1993 | Gueret | 264/73 |
| 5,304,592 | A | * | 4/1994 | Ghahary | 524/437 |
| 5,588,599 | A | | 12/1996 | Novak | |
| 5,690,872 | A | * | 11/1997 | Krieg et al. | 264/73 |
| 6,841,612 | B1 | * | 1/2005 | Yang et al. | 524/523 |
| 2006/0029793 | A1 | * | 2/2006 | Overholt et al. | 428/325 |

* cited by examiner

*Primary Examiner*—Mary Lynn Theisen
(74) *Attorney, Agent, or Firm*—Dale F. Regelman

(57) ABSTRACT

A thermoplastic composition used to form resin chips is disclosed. The thermoplastic composition comprises a plurality of particles having a density of 2.2 or greater encapsulated within a thermoplastic resin, where the plurality of particles does not offgas when heated to a temperature of 500° F., and where the thermoplastic resin has a Barcol Hardness of 30 or greater.

12 Claims, 1 Drawing Sheet

COMPOSITION AND METHOD TO FORM ARTICLES SIMULATING STONE

FIELD OF THE INVENTION

The invention relates to synthetic compositions and processes for simulating granite and other natural stones in the manufacture of household fixtures and similar articles. In particular, the invention is directed to a thermoplastic composition and a method using that thermoplastic composition to produce resin chips such as currently used in the industry for casting such articles by conventional thermosetting molding procedures or by other methods.

BACKGROUND OF THE INVENTION

With the advent of synthetic materials, many processes and compositions have been developed during the last several decades for simulating granite and other stones in the construction of fixtures and other articles such as sinks, counter tops and miscellaneous decorative objects. The particular compositions and processes used have depended in large part on the specific characteristics of the material being simulated, with different fillers and additives being introduced to match the desired appearance and texture of the final product.

Some prior art compositions and methods utilize a ready-made synthetic-resin chip or chip/filler mixture as raw material for casting the desired article in a mold, typically by a thermosetting process. The solid resin chip or mixture may be blended with other chips of different colors and/or with additional fillers, and the resulting dry mixture is then combined with liquid polyester or acrylic thermosetting resin in the presence of an appropriate catalyst for casting or pouring in a mold, or for spraying for setting onto a surface.

U.S. Pat. No. 5,588,599, in the name of James P. Novak, one of the inventors herein, teaches mixing a thermoplastic polyester-resin material with an alumina tri-hydrate (ATH) filler and with a pigment, if desired, in a heated extruder to produce a continuous stream of thermoplastic agglomerate. This product is allowed to cool, then it is cut, ground and screened to a predetermined size, as required to meet the size characteristics of the desired resin-chip product. The resin-chip material so produced may be further mixed with a filler, as required for a particular application, and packaged for sale to commercial users.

SUMMARY OF THE INVENTION

Applicants' invention includes, inter alia, a thermoplastic composition used to form resin chips. Applicants' thermoplastic composition comprises a plurality of particles having a density of 2.2 or greater encapsulated within a thermoplastic resin, where the thermoplastic resin has a Barcol Hardness of 30 or greater.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1:
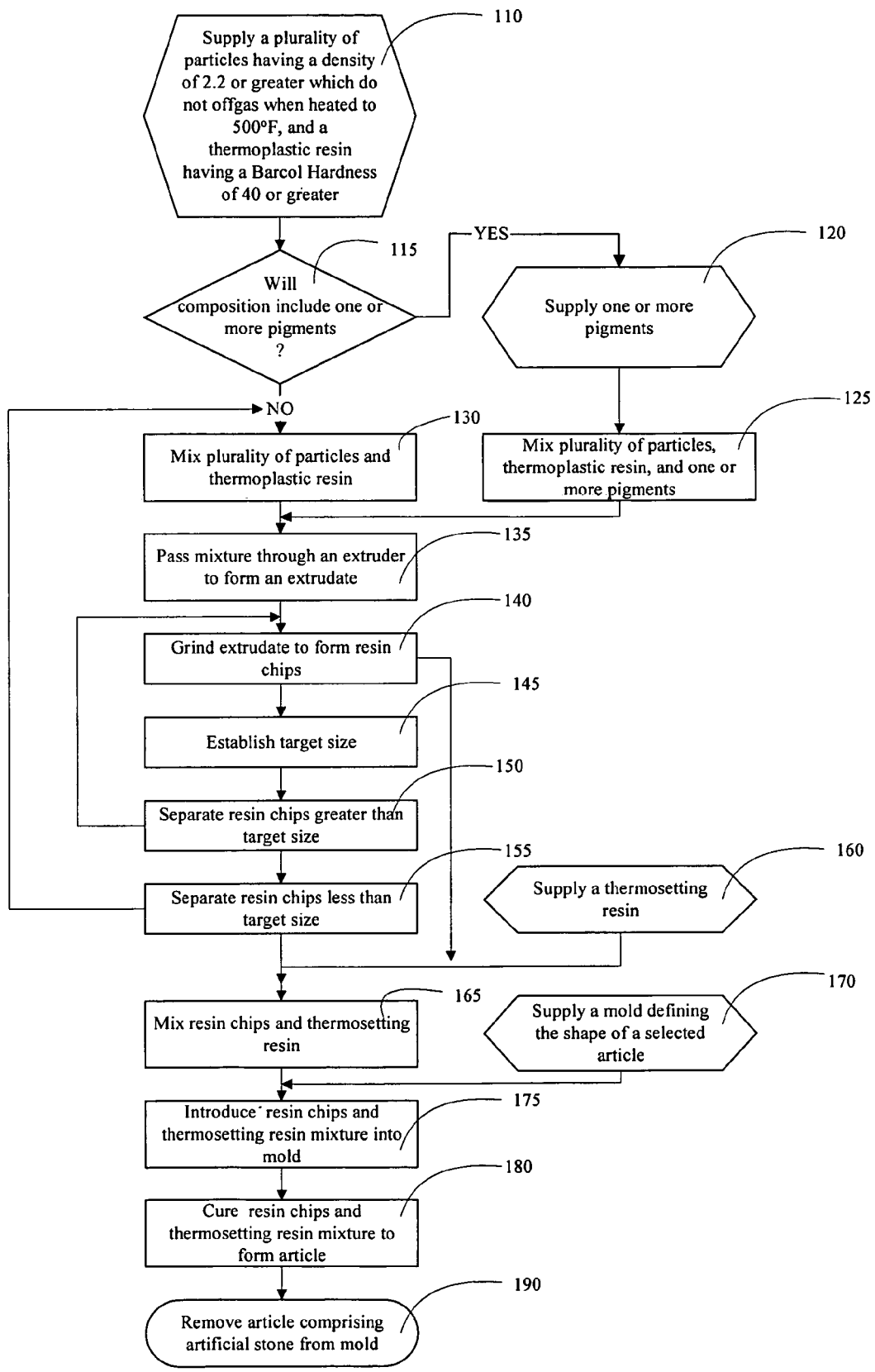
FIG. 1 is a flow chart summarizing the steps of Applicants' method to prepare their thermoplastic composition, and to form resin chips using that thermoplastic composition, and to form an article comprising artificial stone using those resin chips.

This invention is described in preferred embodiments in the following description with reference to the Figures, in which like numbers represent the same or similar elements. Applicants' invention includes a thermoplastic composition, a method to form that thermoplastic composition, a thermosetting composition which comprises the thermoplastic composition, and a method to form articles comprising artificial stone using that thermosetting composition.

Referring now to FIG. 1, in step 110 Applicants' method supplies a plurality of particles having a density of 2.2 or greater. As those skilled in the art will appreciate, the plurality of particles of step 110 are sometimes referred to as a "filler."

Prior art systems generally use aluminum trihydrate ("ATH") as a filler material in compositions used to form articles comprising artificial stone. Using such prior art compositions and methods, the ATH filler is used in combination with a thermoplastic polyester resin, where the filler/resin mixture is melt processed using an extruder operated at a temperatures generally less than about 450° F. The prior art polyester resins include, for example, poly (ethylene terephthalate), poly(butylene terephthalate), and the like.

The extruded ATH/polyester mixture, with or without pigments, is ground to form resin chips. Those resin chips are dispersed in a thermosetting resin, and that resin chips/ thermosetting resin composition is subsequently cured to form an article having the look and feel of stone, such as for example marble, granite, and the like.

In certain embodiments, Applicants' filler does not offgas when heated to a temperature of 500° F. In certain embodiments, Applicants' non-offgassing filler comprises a Group II metal salt, such as Magnesium Hydroxide, Barium Sulfate, and the like. Applicants have found that extruding a thermoplastic composition comprising a resin having a Barcol Hardness of 30 or greater and such a filler at extruder temperatures up to about 500° F. does not produce an extrudate having porosity formed by an offgassing filler material.

As those skilled in the art will appreciate, the "hardness" of a material relates to the material's resistance to deformation, usually by indentation. A Barcol Hardness is obtained by measuring the resistance to penetration of a sharp steel point under a spring load. The instrument, called the Barcol impressor, gives a direct reading on a 0 to 100 scale. ASTM D2583 Barcol Hardness test method can be used to determine the hardness of both reinforced and non-reinforced rigid plastics. The specimen is placed under the indentor of the Barcol Hardness tester and a uniform pressure is applied to the specimen until the dial indication reaches a maximum. The depth of the penetration is converted into absolute Barcol numbers.

The thermoplastic polyester resins used in prior art compositions and methods typically have a Barcol Hardness of about 2. Applicants have found that the cured thermosetting resins used to form the artificial stone articles typically have hardnesses greater than the hardness of the resin chips. For example, a thermosetting composition used to form an article simulating stone may comprise a Barcol Hardness as high as 60.

The hardness mismatch between the prior art resin chips, and the thermosetting resin used to form the ultimate article having the look and feel of stone, sometimes results in that formed article having "soft spots" if relatively large resin chips were disposed at or near the surface of the article. In order to minimize these soft spots, prior art systems could only utilize resin chips having a relatively small size.

As those skilled in the art will appreciate, the visual presentation of an artificial stone article is defined by the resin chips not by the thermosetting composition. This being the case, it is sometimes advantageous to use larger sized resin chips rather than smaller sized resin chips.

Unlike prior art systems, Applicants' composition and method utilize a thermoplastic resin having a Barcol Hardness of 30 or greater. In certain embodiments, Applicants' composition and method utilize a thermoplastic resin having a Barcol Hardness in the range of 40 to 48. In certain embodiments, Applicants' thermoplastic resin is selected from the group consisting of polyacrylates, polyamides, and polyimide (TPI). In certain embodiments, Applicants' composition and method utilize a cross-linked, extrudable polymethylmethacrylate resin sold in commerce under the name CA-86X by Plaskolite West, 2225 East Del Amo Boulevard, Compton, Calif. 90220.

Referring again to FIG. 1, in step 115 Applicants' method determines if Applicants' thermoplastic composition will include one or more pigments. If Applicants' thermoplastic composition will not comprise one or more pigments, then Applicants' method transitions from step 115 to step 130 wherein the method mixes the filler and the thermoplastic resin using conventional techniques and methods. As those skilled in the art will appreciate, Applicants' filler may be supplied in the form of a powder, granules, tablets, and the like. Applicants' thermoplastic resin may be supplied in the form of granules, pellets, and the like. In certain embodiments, step 130 includes tumble mixing the filler material and the thermoplastic resin material. Applicants' method transitions from step 130 to step 135.

The following examples are presented to further illustrate to persons skilled in the art certain preferred resin/filler weight rations. These examples are not intended as limitations, however, upon the scope of the invention, which is defined only by the appended claims.

EXAMPLE I

| RESIN | FILLER | WEIGHT RATIO |
|---|---|---|
| PMMA* | Mg(OH)$_2$ | 45:55 |

*PMMA: Polymethylmethacrylate CA-86X by Plaskolite West.

EXAMPLE II

| RESIN | FILLER | WEIGHT RATIO |
|---|---|---|
| PMMA* | BaSO$_4$ | 25:75 |

*PMMA: Polymethylmethacrylate CA-86X by Plaskolite West.

EXAMPLE III

| RESIN | FILLER | WEIGHT RATIO |
|---|---|---|
| NYLON PA6* | Mg(OH)$_2$ | 45:55 |

*Nylon PA6 (Polyamide 6): Allied Signal (Capron), BASF (Ultramid), Bayer (Durethane) and DSM (Akulon).

EXAMPLE IV

| RESIN | FILLER | WEIGHT RATIO |
|---|---|---|
| NYLON PA6* | BaSO$_4$ | 25:75 |

*Nylon PA6 (Polyamide 6): Allied Signal (Capron), BASF (Ultramid), Bayer (Durethane) and DSM (Akulon).

EXAMPLE V

| RESIN | FILLER | WEIGHT RATIO |
|---|---|---|
| NYLON PA66* | Mg(OH)$_2$ | 45:55 |

*Nylon PA66 (Polyamide 66): Allied Signal (Capron), BASF (Ultramid), Bayer (Durethane) and DSM (Akulon).

EXAMPLE VI

| RESIN | FILLER | WEIGHT RATIO |
|---|---|---|
| NYLON PA6* | BaSO$_4$ | 25:75 |

*Nylon PA66 (Polyamide 66): Allied Signal (Capron), BASF (Ultramid), Bayer (Durethane) and DSM (Akulon).

EXAMPLE VII

| RESIN | FILLER | WEIGHT RATIO |
|---|---|---|
| NYLON PA11/12* | Mg(OH)$_2$ | 45:55 |

*Nylon PA11/12(Polyamide 11/12): Ashley(Ashlene), ELF Atochem(Rilsan).

EXAMPLE VIII

| RESIN | FILLER | WEIGHT RATIO |
|---|---|---|
| NYLON PA11/12* | BaSO$_4$ | 25:75 |

*Nylon PA11/12(Polyamide 11/12): Ashley(Ashlene), ELF Atochem(Rilsan).

EXAMPLE IX

| RESIN | FILLER | WEIGHT RATIO |
|---|---|---|
| POLYIMIDE* | Mg(OH)$_2$ | 38:62 |

*Thermoplastic Polyimide: Mitsui Chemicals (Aurum), Optima Scandinavia AB.

EXAMPLE X

| RESIN | FILLER | WEIGHT RATIO |
|---|---|---|
| POLYIMIDE* | BaSO$_4$ | 15:85 |

*Thermoplastic Polyimide: Mitsui Chemicals (Aurum), Optima Scandinavia AB.

If Applicants' thermoplastic composition will comprise one or more pigments, then Applicants' method includes step 120 wherein the method provides those one or more pigments. Such pigments include, for example, Iron Oxide, Titanium Dioxide, and the like.

Applicants' method transitions from step 120 to step 125 wherein the method mixes the filler, thermoplastic resin, and the one or more pigments. As those skilled in the art will appreciate, Applicants' filler may be supplied in the form of a powder, granules, tablets, and the like. Applicants' thermoplastic resin may be supplied in the form of granules, pellets, and the like. Applicants' one or more pigments may be supplied in form of granules, tablets, and the like. In certain embodiments, step 125 includes tumble mixing the filler material and the thermoplastic resin material.

Applicants' method transitions from step 125 to step 135 wherein the method passes the mixture of step 125 or step 130 through an extruder to form an extrudate. By "extruder," Applicants' mean a device having one or two screws, where those screws are moveably disposed within a heated barrel.

Forming resin chips comprising Applicants' filler encapsulated with a thermoplastic resin having a Barcol Hardness of 30 or greater sometimes requires higher extruder temperatures than do prior art systems. In certain embodiments, step 135 comprises using a temperature of about 350° F. at the rear (hopper) section, to between about 450° F. to about 480° F. at the front (metering) section of the extruder.

Applicants' method transitions from step 135 to step 140 wherein the method grinds the extrudate of step 135 to form Applicants' resin chips. As a general matter, step 140 comprises using conventional apparatus and methods, such as chipping, flaking, grinding, and the like. The resin chips formed in step 140 have a density in the range of about 1.6 g/cc to about 1.8 g/cc. In certain embodiments, resin chips formed in step 140 have a density in the range of about 1.7 g/cc.

In certain embodiments, Applicants' method transitions from step 140 to step 165. In other embodiments, Applicants' method transitions from step 140 to step 145 wherein the method establishes a target resin chip size. Using prior art compositions and methods, the resin chips were limited to a size of about 18 mesh and less. Using Applicants' thermoplastic composition and method, however, the resin chips formed in step 140 may be as large as 2 mesh.

In step 150, Applicants' method separates resin chips larger than the target size of step 145. In certain embodiments, step 150 includes using a mesh screen to separate the resins chips larger than the target size. In certain embodiments, the larger resin chips separated in step 150 are subsequently reground in step 140 for later use.

In step 155, Applicants' method separates resin chips having a size less than the target size of step 145. In certain embodiments, step 155 includes using a mesh screen to separate the resins chips larger than the target size. In certain embodiments, the smaller resin chips separated in step 155 maybe subsequently added to the mixture of step 130 and reprocessed.

In step 160, Applicants' method provides a thermosetting resin. In certain embodiments, Applicants' thermosetting resin comprises an unsaturated polyester or acrylic resin.

In step 165, Applicants' method mixes Applicants' resin chips with Applicants' thermosetting resin. In certain embodiments, Applicants' thermosetting resin comprises a styrene-based composition. Applicants' resin chips comprising polymethylmethacrylate are stable in thermosetting resins including, without limitation, unsaturated polyester, acrylic, styrene, and epoxy resins. The following examples are presented to further illustrate to persons skilled in the art how to make and use Applicants' invention. These examples are not intended as limitations, however, upon the scope of the invention, which is defined only by the appended claims.

EXAMPLE XI

Polymethylmethacrylate

A sample of extruded PMMA (CA-86X) was weighed, and that weighed sample was immersed in styrene for one week. The PMMA material was then removed from the styrene, washed with methanol, dried, and reweighed. The weight loss was 0.86%.

EXAMPLE XII

Polymethylmethacrylate/Magnesium Hydroxide

A sample of extruded PMMA/Mg(OH)$_2$ (1:1 weight ratio) was weighed, and that weighed sample was immersed in styrene for one week. The PMMA material was then removed from the styrene, washed with methanol, dried, and reweighed. The weight loss was 0.81%.

EXAMPLE XIII

Nylons

Samples of nylon material, where that nylon material was selected from the group consisting of Nylon PA6, as described above, Nylon PA66, as described above, and Nylon PA11/12, as described above, were weighed, and those weighed samples were immersed in styrene for one week. The nylon materials were then removed from the styrene, washed with methanol, dried, and reweighed. The weight loss in each case was less than one percent (<1%).

EXAMPLE XIV

Polyimide

A sample of thermoplastic polyimide, as described above, was weighed, and that weighed sample was immersed in styrene for one week. The TPI material was then removed from the styrene, washed with methanol, dried, and reweighed. The weight loss was 0%.

Referring once again to FIG. 1, in step 170 Applicants' method provides a mold which defines a selected article comprising artificial stone. In certain embodiments, that article comprises a counter top. In other embodiments, that article comprises a sink assembly. In step 175 Applicants' method introduces the molding composition of step 165 into the mold of step 170.

In step 180, Applicants' method cures the molding resin disposed in step 175 into the mold of step 170. In certain embodiments, step 180 comprises heating the mold for a predetermined time interval.

In step 190, Applicants' method removes the newly-formed article from the mold. In certain embodiments, step 190 further includes cooling the mold, and the newly-formed article disposed therein, to a predetermined temperature prior to remove of the article from the mold.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to form resin chips for use in the manufacture of artificial stone articles, comprising the steps of:
   providing a plurality of particles having a density of 2.2 or greater, wherein said plurality of particles does not offgas when heated to a temperature of 500 ° F.;
   supplying a thermoplastic resin having a Barcol Hardness of 30 or greater;
   forming a mixture comprising said plurality of particles and said thermoplastic resin; and
   passing said mixture through an extruder to form an extrudate.

2. The method of claim 1, wherein said supplying a thermoplastic resin step further comprises supplying a thermoplastic resin having a Barcol Hardness of 40 or greater.

3. The method of claim 2, wherein said providing a plurality of particles step further comprises providing magnesium hydroxide.

4. The method of claim 2, wherein said providing a plurality of particles step further comprises providing barium sulfate.

5. The method of claim 4, wherein said supplying step further comprises supplying a thermoplastic resin selected from the group consisting of polyacrylates, polyamides, and polyimides.

6. The method of claim 5, wherein said supplying step further comprises supplying polymethylmethacrylate.

7. The method of claim 4, wherein said passing step further comprises passing said mixture through an extruder, wherein said extruder comprises one or more barrel zones, and wherein one or more of those one or more barrel zones are heated to temperature in the range of 450–480° F.

8. The method of claim 7, further comprising the steps of:
   grinding said extrudate to form resin ships, wherein said resin chips have a density of about 1.7 g/cc, and wherein said resin chips lose less than about 1 percent of their weight after immersion in styrene for 1 week.

9. The method of claim 8, further comprising the steps of:
   providing a thermosetting resin;
   mixing said resin chips with said thermosetting resin.

10. A method to form an article comprising artificial stone, comprising the steps of:
    providing resin chips formed by providing a plurality of particles having a density of 2.2 or greater, wherein said plurality of particles does not offgas when heated to a temperature of 500° F.; supplying a thermoplastic resin having a first Barcol Hardness, wherein said first Barcol Hardness is in the range of 40 to 48; forming a mixture comprising said plurality of particles and said thermoplastic resin; passing said mixture through an extruder to form an extrudate; and grinding said extrudate to form said resin chips;
    providing a thermosetting resin, wherein said cured thermosetting resin comprises a second Barcol Hardness, wherein said second Barcol Hardness is in the range of 40 to 48;
    forming a thermosetting composition by mixing said resin chips with said thermosetting resin;
    supplying a mold defining the shape of said article;
    introducing said thermosetting composition into said mold;
    forming said article comprising artificial stone by curing said thermosetting composition; and
    removing said article comprising artificial stone from said mold.

11. The method of claim 10, wherein said forming said article step further comprises forming a countertop comprising artificial stone.

12. The method of claim 11, wherein said forming said article step further comprises forming a sink assembly comprising artificial stone.

* * * * *